United States Patent
Marque-Pucheu et al.

(10) Patent No.: US 10,499,299 B2
(45) Date of Patent: Dec. 3, 2019

(54) PROGRESSIVE TOGGLING OF RADIO FREQUENCY BAND IN A RELAY NODE

(71) Applicant: AIRBUS DS SAS, Elancourt (FR)

(72) Inventors: Gérard Marque-Pucheu, Verneuil (FR); Serge Delmas, Plaisir (FR); Christine Helias-Foret, Montigny le Bretonneux (FR); Christophe Gruet, Montigny le Bretonneux (FR)

(73) Assignee: AIRBUS DS SAS, Elancourt (FR)

( * ) Notice: Subject to any disclaimer, the term of this patent is extended or adjusted under 35 U.S.C. 154(b) by 34 days.

(21) Appl. No.: 15/316,386

(22) PCT Filed: Jun. 5, 2015

(86) PCT No.: PCT/EP2015/062597
§ 371 (c)(1),
(2) Date: Apr. 17, 2017

(87) PCT Pub. No.: WO2015/185733
PCT Pub. Date: Dec. 10, 2015

(65) Prior Publication Data
US 2017/0238226 A1    Aug. 17, 2017

(30) Foreign Application Priority Data

Jun. 6, 2014  (FR) .................................. 14 01373

(51) Int. Cl.
*H04W 36/20* (2009.01)
*H04W 84/00* (2009.01)
(Continued)

(52) U.S. Cl.
CPC ........ *H04W 36/20* (2013.01); *H04B 7/15507* (2013.01); *H04W 36/08* (2013.01);
(Continued)

(58) Field of Classification Search
CPC .. H04B 7/15507; H04W 36/08; H04W 36/20; H04W 48/10; H04W 48/12; H04W 72/0453

See application file for complete search history.

(56) References Cited

U.S. PATENT DOCUMENTS 6,389,059 B1 * 5/2002 Smith ................... G10L 19/012
375/141
9,622,132 B2 * 4/2017 Wang .................. H04W 36/165
(Continued)

FOREIGN PATENT DOCUMENTS

WO   WO 2010/124729 A1   11/2010
WO   WO 2011/141177 A1   11/2011
(Continued)

OTHER PUBLICATIONS

International Search Report as issued in International Patent Application No. PCT/EP2015/062597, dated Aug. 28, 2015.

*Primary Examiner* — Khaled M Kassim
*Assistant Examiner* — Berhanu D Belete
(74) *Attorney, Agent, or Firm* — Pillsbury Winthrop Shaw Pittman LLP (57) ABSTRACT

A method of progressive toggling from a first frequency band to a new frequency band, first mobile nodes being previously attached to the relay node, the method including, upon detection by the relay node of interference on the first frequency band, the relay node triggers the progressive toggling which includes: a selection by the relay node of a new frequency band not suffering interference, an occupation of the new frequency band by the relay node, a blocking of access to the connection to the relay node via the first frequency band for at least one second mobile node, a toggling of the first radio communications of the first active mobile nodes from the first frequency band to the new frequency band, and a freeing of the first frequency band by the relay node.

9 Claims, 5 Drawing Sheets

(51) Int. Cl.
*H04B 7/155* (2006.01)
*H04W 36/08* (2009.01)
*H04W 48/10* (2009.01)
*H04W 48/12* (2009.01)
*H04W 72/04* (2009.01)

(52) U.S. Cl.
CPC ........... *H04W 48/10* (2013.01); *H04W 48/12* (2013.01); *H04W 72/0453* (2013.01); *H04W 84/005* (2013.01)

(56) References Cited

U.S. PATENT DOCUMENTS

| | | | |
|---|---|---|---|
| 10,334,507 B2* | 6/2019 | Hassan | H04W 48/14 |
| 2005/0059363 A1* | 3/2005 | Hansen | G01S 7/021 |
| | | | 455/127.4 |
| 2007/0117517 A1* | 5/2007 | Hui | H04W 72/085 |
| | | | 455/67.11 |
| 2009/0061780 A1* | 3/2009 | Sekiya | G01S 7/021 |
| | | | 455/63.1 |
| 2009/0086747 A1* | 4/2009 | Naven | H04L 47/52 |
| | | | 370/412 |
| 2009/0213760 A1* | 8/2009 | Shin | H04W 74/002 |
| | | | 370/254 |
| 2009/0316811 A1* | 12/2009 | Maeda | H04W 76/11 |
| | | | 375/260 |
| 2010/0029216 A1* | 2/2010 | Jovicic | H04B 7/2615 |
| | | | 455/68 |
| 2011/0164587 A1* | 7/2011 | Seo | H04L 1/1671 |
| | | | 370/329 |
| 2011/0228666 A1* | 9/2011 | Barbieri | H04W 76/14 |
| | | | 370/216 |
| 2011/0267958 A1* | 11/2011 | Sekiya | G01S 7/021 |
| | | | 370/241 |
| 2011/0314522 A1* | 12/2011 | Palanigounder | H04B 7/155 |
| | | | 726/4 |
| 2012/0094660 A1* | 4/2012 | Radulescu | H04W 24/10 |
| | | | 455/434 |
| 2012/0113903 A1* | 5/2012 | Kneckt | H04W 74/04 |
| | | | 370/329 |
| 2012/0307717 A1* | 12/2012 | Worrall | H04B 7/15557 |
| | | | 370/315 |
| 2013/0077542 A1* | 3/2013 | Yang | H04B 7/15542 |
| | | | 370/280 |
| 2013/0235758 A1* | 9/2013 | Delmas | H04B 7/2606 |
| | | | 370/254 |
| 2013/0258989 A1* | 10/2013 | Ribeiro | H04W 16/14 |
| | | | 370/329 |
| 2014/0056250 A1* | 2/2014 | Cattoni | H04W 72/082 |
| | | | 370/329 |
| 2014/0086212 A1* | 3/2014 | Kafle | H04B 17/345 |
| | | | 370/331 |
| 2014/0094165 A1* | 4/2014 | Karlsson | H04W 16/14 |
| | | | 455/423 |
| 2014/0162666 A1* | 6/2014 | Ratasuk | H04W 72/0486 |
| | | | 455/450 |
| 2014/0273939 A1* | 9/2014 | Hyde | H04W 4/24 |
| | | | 455/406 |
| 2014/0273940 A1* | 9/2014 | Hyde | H04L 12/1478 |
| | | | 455/406 |
| 2015/0050941 A1* | 2/2015 | Sawada | H04W 36/06 |
| | | | 455/452.2 |
| 2015/0063146 A1* | 3/2015 | Sadek | H04J 1/16 |
| | | | 370/252 |
| 2016/0302217 A1* | 10/2016 | Yang | H04W 72/12 |
| 2017/0118758 A1* | 4/2017 | Li | H04W 16/14 |

FOREIGN PATENT DOCUMENTS

| | | |
|---|---|---|
| WO | WO 2012/085620 A1 | 6/2012 |
| WO | WO 2012/158077 A1 | 11/2012 |
| WO | WO 2014/086584 A1 | 6/2014 |

\* cited by examiner

PROGRESSIVE TOGGLING OF RADIO FREQUENCY BAND IN A RELAY NODE

CROSS-REFERENCE TO RELATED APPLICATIONS

This is the U.S. National Stage of PCT/EP2015/062597, filed Jun. 5, 2015, which in turn claims priority to French Application No. 1401373, filed Jun. 6, 2014, the entire contents of all applications are incorporated herein by reference in their entireties.

FIELD OF THE INVENTION

The present invention relates, in a general manner, to a method of progressive toggling of radio frequency band in a relay node of a radiocommunication network. The invention finds application in the deployment of radiocommunication networks, for example of ad-hoc or infrastructure type such as those used by security professionals or by operators of public networks.

STATE OF THE PRIOR ART AND TECHNICAL PROBLEMS ENCOUNTERED

Cellular radiocommunication systems proposing a toggling of communication channel between a base station and at least one mobile station are known. Toggling between a first communication channel and a second communication channel has the advantage of obtaining better radio transmission-reception without interference between the base station and the mobile station.

However, known methods all the same involve an interruption of the communication between the two entities, at a given time for a brief instant, for toggling from one channel to another without taking into consideration potential mobile stations arriving in the communication while channel toggling is underway.

There thus exists a need for progressive toggling in a relay node from a first communication channel of a first frequency band to a second communication channel of a second frequency band without interruption of service for the stations in communication and while taking into consideration stations arriving in the communication while channel change is underway.

DESCRIPTION OF THE INVENTION

An objective of the invention is to overcome the drawbacks of the prior art by proposing a method of progressive toggling from a first frequency band to a second frequency band in order to minimise interruptions in communications underway in the first band while accepting new communications in the second band.

The invention thus relates to a method of progressive toggling from a first frequency band to a new frequency band, first mobile nodes being previously attached to a relay node, characterised in that upon detection by the relay node of interference on the first frequency band, the relay node triggers the progressive toggling which includes:
a selection by the relay node of a new frequency band not suffering interference, the new frequency band being separate from the first frequency band,
an occupation of the new frequency band by the relay node,
a blocking of access to the connection to the relay node via the first frequency band for at least one second mobile node,
a toggling of the first radio communications of the first active mobile nodes from the first frequency band to the new frequency band, and
a freeing of the first frequency band by the relay node.

The invention makes it possible to obtain automatic and progressive toggling of frequency bands. Automatic toggling is carried out on detection of interference on the frequency band in use by the relay node.

The progressive toggling from a first frequency band to a new frequency band in a same relay node enables the first mobile nodes to minimise interruption of the communication already established or even to avoid it. On occupation of the new frequency band, the relay node can transmit quite quickly to the first mobile active nodes via the first frequency band the parameters necessary to access the second frequency band. Similarly, progressive toggling has the advantage of preventing second mobile nodes arriving under the coverage of the cell managed by the relay node from connecting up to the relay node via the first frequency band suffering interference. Thus the relay node blocks, for the second relay nodes, access to the connection to the relay node via the frequency band suffering interference.

Thanks to the blocking of access to the connection to the relay node via the first frequency band for at least one second mobile node, the progressive toggling takes into consideration mobile nodes arriving while toggling is underway herein called second mobile nodes.

The invention also comprises any of the following characteristics:
the selection of the new frequency band is made from among a plurality of separate frequency bands defined in a table of frequency bands,
the occupation of the new frequency band is carried out by the broadcasting of a synchronisation signal and system information by the relay node on a control channel of the new frequency band,
the blocking is carried out by the broadcasting of system information via the first frequency band, the system information including:
an inaccessibility to the connection to the relay node via the first frequency band from a first time-stamped data, and
an accessibility to the connection to the relay node via the new frequency band from a second time-stamped data.
the toggling of the first active nodes from the first frequency band to the new frequency band corresponds to a handover of a mobile node from a first relay node accessible via the first frequency band to a second relay node accessible via the new frequency band, the first relay node and the second relay node being a single and same relay node,
according to another embodiment, the toggling of a first active node from the first frequency band to the new frequency band corresponds to a first toggling of transmission of traffic data on the resources of the new frequency band, control data being broadcast via the first frequency band, then a toggling of transmission of control data on the resources of the new frequency band,
the freeing of the first frequency band is carried out by stopping the broadcasting of the synchronisation signal and system information on the control channel of the first frequency band, after the detection of interference on the frequency band the relay node triggers a random toggling time and on the passing of this toggling time if the first frequency band is suffering interference, progressive toggling is triggered.

The invention also relates to a communication system including at least one relay node and first and second mobile nodes.

The invention also relates to a relay node of a radiocommunication system characterised in that it is capable of executing the steps of the method of progressive toggling from a first frequency band to a new frequency band, and first mobile nodes being previously attached to the relay node via the first frequency band. The relay node including:
 a unit for detecting interference on the first frequency band,
 a unit for selecting a new frequency band not suffering interference, the new frequency band being separate from the first frequency band,
 a unit for occupying the new frequency band,
 a unit for blocking access to the connection to the relay node via the first frequency band for at least one second mobile node, and
 a unit for freeing the first frequency band.

The invention also relates to a mobile node of a radiocommunication system including at least one relay node capable of executing the method of progressive toggling from a first frequency band to a new frequency band. The mobile node includes:
 means for detecting a blocking of access to the connection to the relay node via the first frequency band, when the mobile node is considered as second mobile node, and
 means for executing a toggling order coming from the relay node when the mobile node is considered as first active mobile node.

BRIEF DESCRIPTION OF THE FIGURES

The invention will be more fully understood by reading the description that follows and by examining the figures that accompany it. These are only presented for illustrative purposes but in no way limit the invention. The figures show.

DESCRIPTION OF THE INVENTION

It should be noted herewith that the figures are not to scale.

The invention applies to any ad-hoc cellular radiocommunication system, such as Wifi, Bluetooth networks or any relayed cellular radiocommunication system such as systems with TETRA ("TErrestrial Trunked RAdio"), TETRAPOL, WIMAX ("Worldwide Interoperability for Microwave Access") infrastructures, LTE ("Long Term Evolution") networks, or all third or fourth generation radiocommunication networks.

Figure 1A:
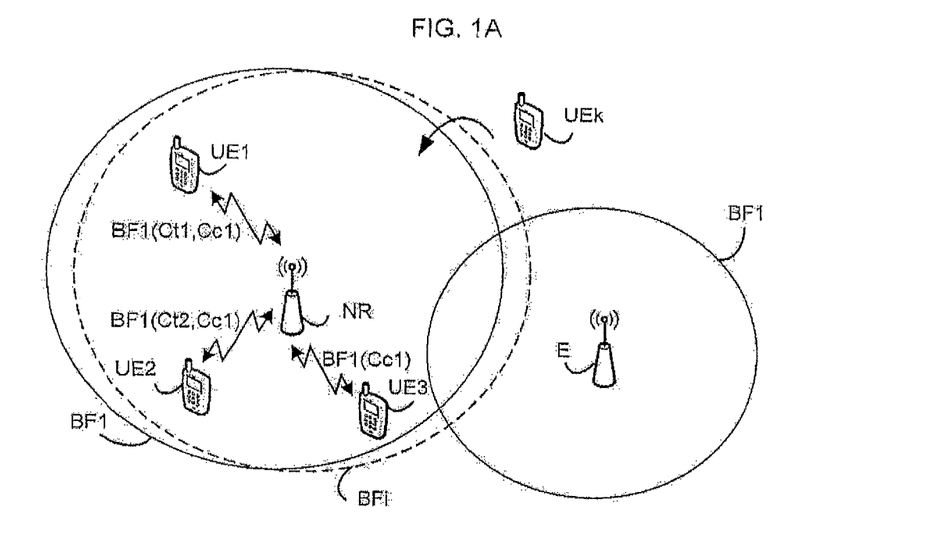
FIGS. 1A, 1B and 1C: a schematic representation of a communication system respectively according to the steps of the method of progressive toggling according to the invention.
Figure 1B:
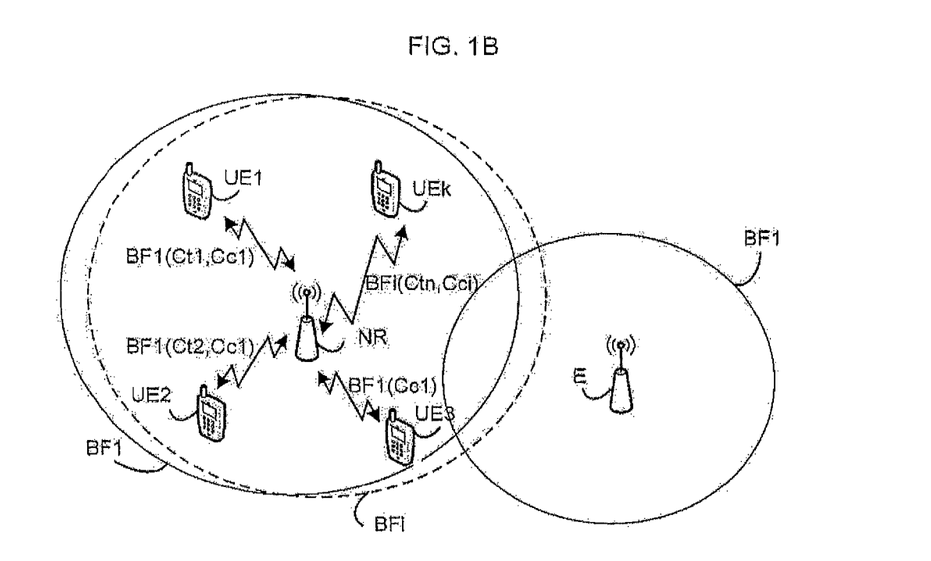
Figure 1C:
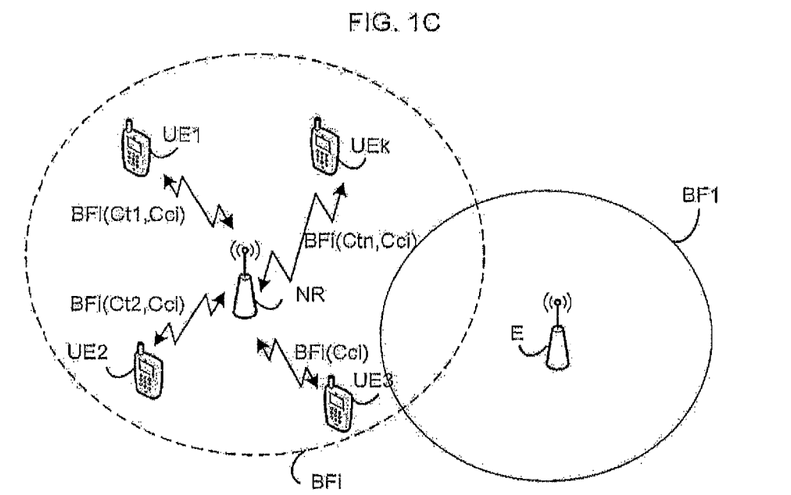

Referring to FIGS. 1A, 1B, 1C, such a cellular radiocommunication system comprises one or more cells (a single cell is represented), each formed by at least one relay node NR to which is connected in a first frequency band BF1 one or more mobile nodes UE1, UE2, called first mobile nodes. On detection by the relay node NR of interference on the first frequency band BF1 caused for example by an autonomous radio equipment E, the relay node orders the toggling of frequency band according to the method of the invention. The relay node NR transmits on a second frequency band BFi (as illustrated in FIG. 1B) in order that new mobile nodes UEk, called second mobile nodes, arriving in the cell of the relay node NR can connect to the relay node NR in the second frequency band BFi. The relay node NR notifies the first mobile active nodes UE1, UE2 that a new frequency band BFi is established and that they can toggle their radio communications on this new frequency band in order to minimise breaks to communications underway. Once all the first mobile active nodes UE1, UE2 have notified their toggling to the second frequency band BFi, the relay node NR frees the first frequency band BF1 in order that it is used by other relay nodes of the network that do not suffer interference on the band BF1 (as illustrated in FIG. 1C).

A frequency band BF comprises a set of radio channels. A first part of the set of radio channels, which are called uplink channels, is dedicated to the transmission of uplink communications from a mobile node to the relay node, A second part of radio channels, which are called downlink channels, is dedicated to the transmission of downlink communications from the relay node to one or more mobile nodes. Depending on the technology implemented in the network, this sharing of channels in uplink or downlink sense can take place in frequency (FDD) or in time (TDD).

The set of uplink and downlink radio channels of a frequency band includes control channels and traffic channels.

The traffic channels $Ct1, Ct2, \ldots Ctm, \ldots CtM$ are each established between the relay node and a mobile node or a group of mobile nodes present in the cell of the relay node. The traffic channels $Ct1, Ct2, \ldots Ctm, \ldots CtM$ transport traffic data such as voice data, multimedia data, as well as signalisation data associated with the traffic. The control channels Cc broadcast control information such as synchronisation information and system information necessary for synchronisation between a relay node and at least one mobile node, allocation information necessary for the allocation of resources.

Each relay node of the radiocommunication system includes a table of frequencies TBF which lists the different frequency bands $BF1, BF2, \ldots BFi, \ldots, BFI$ of the frequency spectrum used by the radiocommunication system. The table of frequencies indicates for each of the frequency bands whether the band is in the free state or in the occupied state. Frequency band in the free state is taken to mean a frequency band not suffering interference or suffering very slight interference by another radio equipment far away from the relay node. The other radio equipment may be another relay node of the radiocommunication system that uses the same frequency band as the relay node NR but which is sufficiently far away from the relay node NR so as not to interfere in its radio communications.

Frequency band in the occupied state is taken to mean a frequency band partially or totally suffering interference by a radio equipment close to the relay node NR and which prevents efficient radio communication between the relay node and the mobile nodes that are attached to it via said frequency band. The other radio equipment may be a radio equipment independent of the radio communication system that forces its radio transmissions on a part of the frequency band used by the relay node NR. According to another case, for example in the case of ad-hoc networks, the other radio equipment may be another relay node of the radiocommunication system that arrives and is deployed using the same frequency band as the relay node NR and which is sufficiently close to the relay node NR to interfere in its communications.

The tables of frequencies in the relay nodes of the system may include, for same frequency bands, different states. The states of the frequency bands in the table of frequencies are updated periodically by the relay node.

A mobile node, also called mobile terminal, is for example a telephone (Smartphone), a tablet, a USB key-modem or any other fixed or mobile equipment (GPS, computer, video screen, etc.). A mobile node is an entity capable of registering itself with a relay node in the cell of which it is present. Once registered, the mobile node can request via an uplink control channel the establishment of a traffic channel for communicating through the intermediary of the relay node with other mobile nodes present in the cell or in other cells of the network.

In the remainder of the description, first mobile nodes are taken to mean the mobile terminals that are attached to the relay node via the first frequency band BF1 before the toggling of frequency bands. Second mobile nodes are taken to mean the mobile terminals that enter into the cell of the mobile node while toggling is underway. Active mobile nodes are taken to mean mobile nodes connected to a relay node through a specific frequency band, they are undergoing communication, traffic channels have been allocated to them by the relay node in the frequency band. Non-active mobile nodes are taken to mean mobile nodes present under the coverage of the relay node which attach to the relay node via a specific frequency band but which are not connected to the relay node. Mobile node attached to a relay node is taken to mean a mobile node that has selected in an autonomous manner a relay node. A non-active mobile node is a mobile node attached to a relay but not connected to the relay node. The non-active mobile node has selected in an autonomous manner the relay node and receives from the specific frequency band control information broadcast by the relay node, but no traffic channel is allocated to it.

The relay node NR may be integrated in a conventional fixed or mobile infrastructure for managing relayed communications such as for TETRA, TETRAPOL, LTE, WIMAX networks. In a variant, the relay node NR can communicate directly with other neighbouring relay nodes without relayed infrastructure such as ad-hoc networks of Wifi or Bluetooth type.

Figure 2:
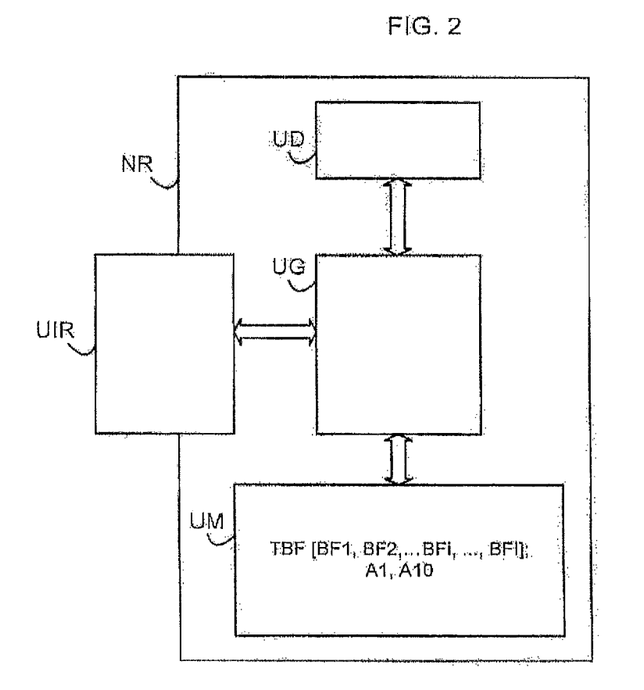
FIG. 2: a block diagram of a relay node carrying out toggling according to the method of the invention.

FIG. 2 illustrates such a relay node in greater detail. The relay node includes:
- a unit UD for detecting interference on the frequency band in use by the relay node and for detecting the state of the different frequency bands BF1, BF2, ... BFi, ... BFI of the frequency spectrum used by the radio-communication system,
- a unit UG for managing the progressive toggling of the frequency band,
- a unit UIR for radio communication with first mobile nodes via the first frequency band and with first and second mobile nodes via the second frequency band, and
- a memorisation unit UM.

The relay node includes other units of conventional operation not described here.

The unit UD comprises for example one or more processors implementing a detection control of interferences on the frequency band in use by the relay node, called first frequency band. According to a first embodiment, the detection control may be carried out by a measurement of the radio communication performances during exchanges between the relay node and its first active mobile nodes. When the radio communication performances decrease and pass under a minimum performance threshold then the first frequency band may be considered as suffering interference.

According to another embodiment, the radio control may be carried out from the measurement of the spectral efficiency of the first frequency band by the first mobile nodes. This measurement is transferred to the relay node, which compares the measurement or the mean of the measurements carried out with a minimum spectral efficiency threshold. If the spectral efficiency Si of the first frequency band BF1 is less than the minimum spectral efficiency threshold then the frequency band is detected as suffering interference. Otherwise, the frequency band is not suffering interference or is only suffering slight interference.

The unit UD also has for role to detect the state of occupation of each frequency band BF1, BF2, ..., BFi, ..., BFI, of the frequency spectrum used by the radiocommunication system: being free or being occupied.

The unit UD requests each first mobile node to measure the quality of the different frequency bands of the frequency spectrum and to transfer the measurements to the relay node. For each frequency band, the relay node compares whether the measurement received or the average of the measurements received is below a quality reference threshold. If the measurement is below the reference threshold then the state of the frequency band is considered as occupied. Otherwise, the state of the frequency band is considered as free. The unit UD of the relay node memorises the state determined for each frequency band in the table of frequency bands TBF. The unit UD periodically updates the table of frequencies TBF at each measurement carried out on a frequency band. The quality of a frequency band may be measured as a function of the spectral efficiency.

The unit UG comprises for example one or more processors for managing the progressive toggling of frequency bands between the relay node and the mobile nodes present and to come in the cell. The unit UG has the roles:
- of selecting a new frequency band not suffering interference from the table TBF,
- of blocking access to the connection to the relay node through the intermediary of the first frequency band suffering interference for second mobile nodes,
- of notifying the toggling of frequency bands to the first non-active mobile nodes, or to control the toggling of frequencies to the first active nodes, and
- of freeing the frequency band suffering interference.

In the case of wireless networks and relatively to the selection of frequency band, the unit UG may use the DFS (Dynamic Frequency Selection) protocol which has the objective of dynamically selecting radio bands in order to obtain the best frequency performance. The DFS protocol is implemented according to the norms 802.11h and 802.16h. In this case, the protocol makes use of the table of frequencies TBF for selecting the frequency band.

The unit UIR makes it possible to transmit and to receive messages, notifications from/to the mobile nodes via the first frequency band and the new frequency band. In a variant, the unit UIR comprises two separate modules, a first module managing exchanges with the first mobile nodes in the first frequency band BF1 and a second module managing exchanges with the first and the second mobile nodes in the new frequency band BFi.

The unit UM is a memory support in which programmes may be saved. It includes volatile and/or non-volatile memories such as EEPROM, ROM, PROM, RAM, DRAM, SRAM memories, etc. The unit UM also memorises the table of frequency bands TBF updated by the relay node NR.

Figure 3:
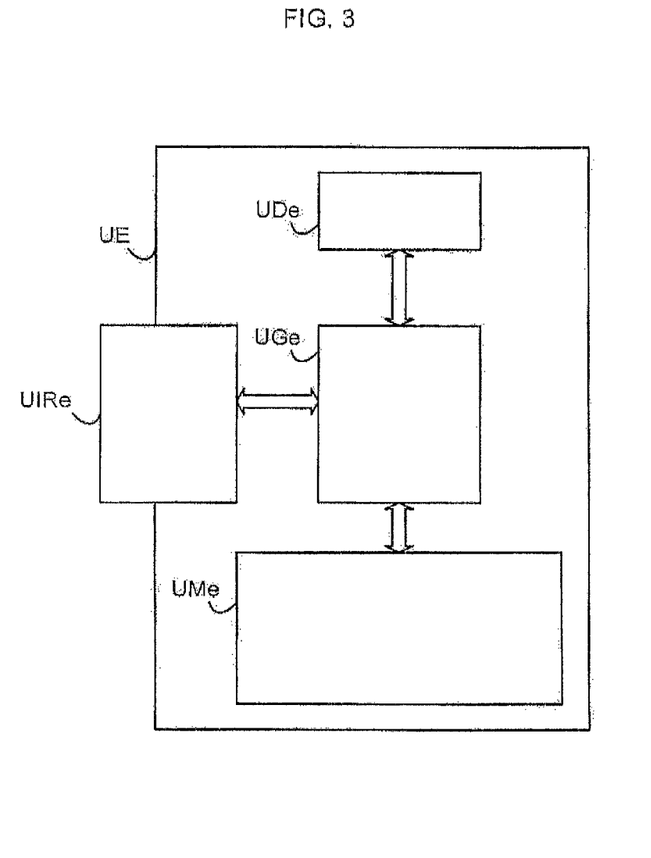
FIG. 3: a block diagram of a mobile node according to the invention.

As illustrated in FIG. 3, each mobile node UE includes:
a unit UDe for measuring the quality of each frequency band BF1, BF2, . . . , BFi, . . . BFI of the frequency spectrum used by the radiocommunication system,
a unit UGe for managing the toggling of frequency bands,
a unit UIRe for radio communication with a relay node, and
a memorisation unit UMe.

The unit UDe comprises one or more processors implementing quality measurements of frequency bands used by the radiocommunication system. When the mobile node, as first mobile node, is connected to a relay node these measurements are transmitted to the relay node so that it detects possible interference of the first frequency band or that it detects the state of occupation of each frequency band in order to update the table of frequencies TBF.

The unit UGe comprises for example one or more processors for:
attaching to a relay node through the intermediary of a specific frequency band,
detecting the blocking of access to the connection to the relay node transmitting on the first specific frequency band as a function of the system information transmitted by said relay node via the first frequency band and to attach to said relay node through the intermediary of a new frequency band as a function of the system information transmitted by said relay node via the first frequency band,
processing a toggling order received by the relay node to which it is connected to carry out toggling from the first frequency band to the new frequency band.

The unit UGe of a mobile node manages other conventional functions of a mobile node, which are not described here.

The unit UIRe makes it possible to transmit and to receive messages, notifications from/to the relay nodes via the first frequency band and the new frequency band. In a variant, the unit UIRe comprises two separate modules, a first module managing exchanges with the relay node in the first frequency band BF1 and a second module managing exchanges with the relay node in the new frequency band BFi.

The unit UM is a memory support in which programmes may be saved. It includes volatile and/or non-volatile memories such as EEPROM, ROM, PROM, RAM, DRAM, SRAM memories, etc.

Figure 4:
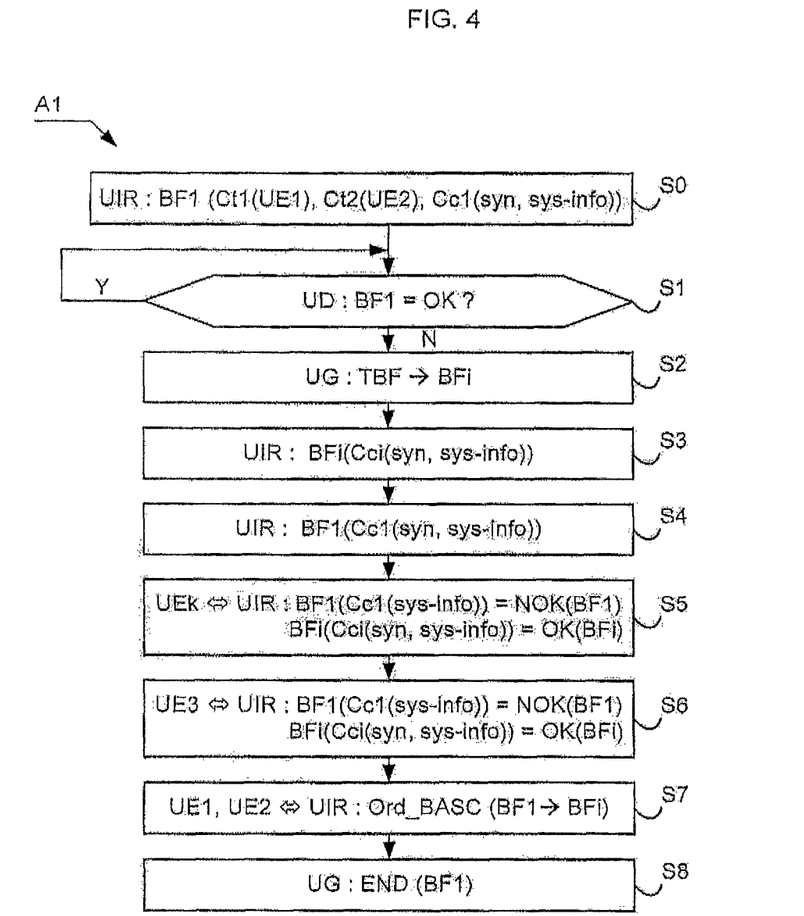
FIG. 4: a functional diagram of a method of toggling according to the invention.

FIG. 4 represents the logical diagram of the algorithm A1 implementing the steps of the method of progressive toggling of frequency band according to the invention.

At the initial step S0, it is considered that the relay node NR communicates via the unit UIR of the relay node with the units UIRe of the first mobile nodes UE1, UE2 in a first frequency band BF1. According to the example, control channels Cc1 and traffic channels Ct1, Ct2 are established between the relay node NR and respectively the active mobile node UE1 and the active mobile node UE2. The mobile node UE3 included under the network coverage of the relay node NR is non-active since no traffic channel is established between it and the relay node. The mobile node UE3 that has attached to the relay node NR via the first frequency band receives control information broadcast by the relay node via the control channel Cc1. The relay node occupies the first frequency band BF1 while transmitting a synchronisation signal "syn" and a system information signal "sys-inf" via the control channel Cc1 of the first frequency band.

At step S1, the detection unit UD of the relay node carries out radio measurements of the network in order to detect possible interference on the frequency band BF1. As long as there is no detection of interference, that is to say as long as "BF1=OK" is at "Y" in FIG. 3, the relay node NR continues to exchange on the frequency band BF1. As soon as the unit UD of the relay node detects interference, that is to say that "BF1=OK" is at "N" in FIG. 3, the management unit UG of the relay node NR controls the toggling of frequency band at step S2.

At step S2, the unit UG of the relay node selects in the table TBF a frequency band in the free state BFi. The selection may be made as a function of the frequency band having the best spectral efficiency hence indicating that it is not suffering interference or suffering very slight interference by another neighbouring radio equipment.

Then at step S3, the unit UIR of the relay node occupies the new frequency band BFi while transmitting a synchronisation signal "syn" and a system information signal "sys-info" in the control channel Cci of the second frequency band BFi. The relay node thus indicates that it uses the frequency band BFi to all the mobile nodes not yet active UE3, or arriving under the cell of the relay node NR such as the mobile node UEk. At step S4, the relay node NR continues to transmit a synchronisation signal "syn" and a system information signal "sys-info" in the control channel Cc1 of the first frequency band BF1 in order to indicate that the first frequency band is still occupied. However the relay node blocks any access to the connection to said relay node via the first frequency band BF1 for any second mobile node UEk. In fact, during the execution of the progressive toggling of frequency bands, the unit UG of the relay node modifies the system information signal "sys-info" relative to the first frequency band BF1 in order to indicate to any second mobile node UEk the impossibility of connecting to the relay node via the first frequency band BF1. The system information signal then includes the following information:
inaccessibility to the connection to the relay node via the first frequency band BF1 from an instant corresponding to a first time-stamped data,
accessibility to the connection to the relay node via the new frequency band BFi from an instant corresponding to a second time-stamped data.

The relay node remains accessible to the connection via the first frequency band to the first mobile nodes already connected to the relay node NR. The first time-stamped data and the second time-stamped data are defined such that on attachment of a second mobile node to the relay node via the new frequency band BFi, access to the connection to the relay node via the frequency band BF1 is not already blocked by the relay node.

Step S4 may be executed before or at the same time as step S3.

At step S5, on attachment to the relay node via the first frequency band by the mobile node UEk, the unit UIRe of the second mobile node UEk receives control information broadcast by the relay node via the first frequency band. The system information sys-info data indicate the inaccessibility to the connection of the relay node via the first band from an instant corresponding to the first time-stamped data. The second mobile node thus considers that the relay node is inaccessible from the frequency band BF1: "NOK(BF1)". At the same time, the second mobile node UEk receives, via this same system information, the information that the relay node is accessible to the connection via the new frequency band BFi from an instant corresponding to the second time-stamped data. The second mobile node thus considers that the relay node is accessible from the frequency band BFi: "OK(BFi)". The frequency parameters of the new frequency band BFi may also be transmitted in the information sys-info of the first frequency band. In a variant, the second mobile node UEk detects by itself the synchronisation signal transmitted by the relay node in the new frequency band BFi and requests a registration with the relay node NR in the new frequency band BFi via an uplink control channel in the new frequency band BFi. For example according to LTE technology, the relay node transmits via the control channels PSCH (Primary Synchronisation Channel), SSS (Secondary Synchronisation Channel) and PBCH (Physical Broadcast Channel) the physical parameters of the system, which are: the synchronisation, the identity of the cell, the LTE band width as well as the system time.

At step S6, the first non-active mobile node UE3 also receives the system information broadcast on the control channel of the frequency band BF1 and is informed of the inaccessibility to the connection to the relay node via the frequency band BF1: "NOK(BF1)". Similarly, thanks to this same system information, the first non-active mobile node UE3 is informed of the accessibility to the connection to the relay node via the second frequency band BFi: "OK(BFi)". The non-active mobile node is going to detach from the relay node NR via the first frequency band BF1, and to attach to the mobile node via the new frequency band BFi.

Steps S5 and S6 may be executed at the same time.

At step S7, the relay node orders the first active terminals UE1, UE2 the toggling of their communication to the new band radio BFi. The order Ord_BASC is a signalisation data transmitted for each active mobile node UE1, UE2 in the downlink traffic channel respectively Ct1 and Ct2 of the frequency band BF1. According to a first embodiment, the toggling from the first frequency band BF1 to the new frequency band BFi for the first mobile active nodes UE1 and UE2 corresponds to a conventional toggling also called "handover", of a mobile node between two close relay nodes having different frequency bands. In the present case of the invention, the close relay nodes are a single and same relay node that manages two different frequency bands. Before the actual toggling of bands, the first mobile node knows the parameters for accessing the new frequency band BFi. This enables rapid toggling while minimising the communication interruption time of the active mobile node. The parameters for accessing the new frequency band BFi may be transmitted to the first active mobile node at the same time as the toggling order or on reading the system information sys-info of the band BF1 after the toggling order. The scheduling of the toggling of each active mobile node UE1, UE2 may take place in a successive manner by the relay node.

According to another embodiment, the toggling of a first active mobile node from the first frequency band BF1 to the new frequency band BFi may take place in an even more progressive manner, without any interruption of communication. In fact, the management unit UG of the relay node NR may, during transmission of the toggling order Ord_BASC, order the transmission of traffic data by allocating resources in the new frequency band BFi while continuing to broadcast control information in the first frequency band BF1. This has for effect the possibility of accessing more rapidly resources not suffering interference for transmitting traffic data without however waiting for all the resources in the new frequency band to be available to toggle in one go control data and traffic data. The information on the allocation of resources for traffic data in the new frequency band BFi are indicated in the system information sys-info transmitted via the control channel Cc1 in the first frequency band BF1. Thus the toggling of traffic data from the first frequency band to the new frequency band takes place without interruption of the communication established by the first active mobile node. If the interference of the first frequency band endures, the relay node searches for the necessary resources in the new frequency band BFi to allocate them to the broadcasting of control information. Once the toggling of the transmissions of control and traffic data has been carried out on the new frequency band BFi, the relay node passes to the next step.

In a variant, before total toggling of the frequency bands, it may be that the relay node detects that the first frequency band BF1 is no longer suffering interference. In this case, the relay node can once again allocate resources in the band BF1 for the transmission of traffic data knowing that the control data are already broadcast in this frequency band.

After the actual and total toggling of control data and traffic data from the first frequency band BF1 to the second frequency band BFi, each first active mobile node informs the relay node NR that the mobile node has indeed been toggled to the new frequency band. This information is transmitted to the relay node via a control channel of the new frequency band BFi, for example the uplink control channel RACH (Random Access Channel) in LTE.

In a variant, the relay node NR activates a toggling time during for example the first transmission of the toggling order to a first active mobile node. At the end of the passing of the toggling time, the relay node considers that the toggling is finished.

In a variant, to consider the actual toggling of bands, the relay node may combine the end of the toggling time and the reception of all the end of toggling information of each active mobile node that has been toggled.

At step S8, as soon as all the first mobile active nodes UE1, UE2 have toggled their radio communication from the first frequency band to the second frequency band and have informed the relay node NR thereof and/or when the toggling time has passed, the relay node frees the first frequency band BF1: END(BF1). "Frees the first frequency band" is taken to mean the fact that the relay node no longer transmits a synchronisation signal syn on the control channel Cc1 of the first frequency band BF1. Other relay nodes could also select the frequency band BF1 that they consider as suffering little interference to exchange with mobile nodes of their cell.

The toggling of frequency bands takes place progressively and thus enables the first mobile active nodes not to interrupt suddenly their communication or to reduce the interruption time for toggling in the new frequency band. New mobile nodes that enter into the cell of the relay node NR during toggling can attach and connect to the relay node NR in the new frequency band BFi.

Figure 5:
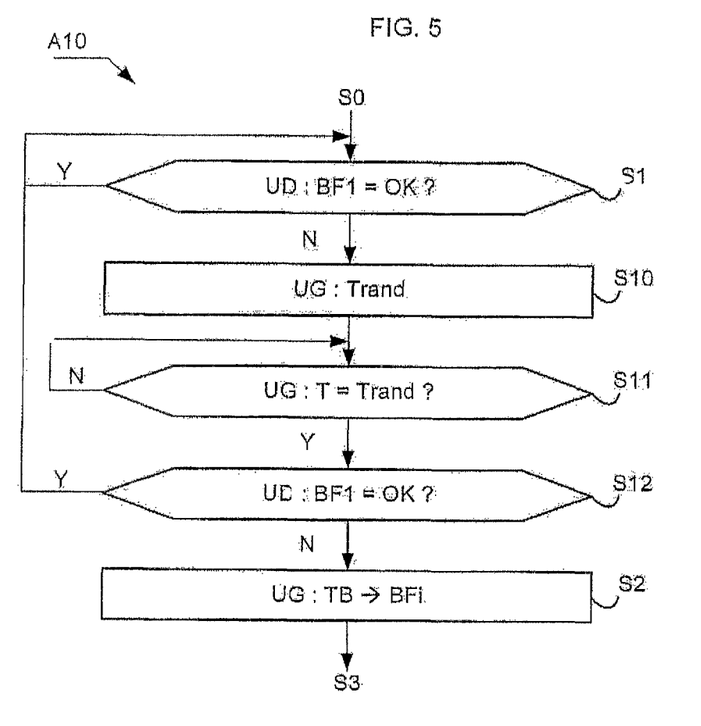
FIG. 5: a functional diagram of an improvement of the method of toggling according to the invention.

FIG. 5 represents an improvement of the method of progressive toggling of frequency band while avoiding any conflict of selection of a same second frequency band by two neighbouring relay nodes in the communication system which executes a toggling of frequency band at the same time. The steps are added to the steps of the method illustrated in FIG. 3.

At step S10, executed after step S1 of detection of interference on the frequency band BF1, the management unit UG of the relay node determines a random time value Trand. The unit UG launches a temporisation at step S11 which does not stop as long as the passed time T is different to the value Trand: "T=Trand" is at "N" in FIG. 4.

As of the end of temporisation, that is to say as soon as "T=Trand" is at "Y" in FIG. 4, the management unit UG passes to step S12. At step S12, the unit UG verifies whether the first frequency band BF1 is still suffering interference. The verification of interference is identical to the detection of interference. If the first frequency band is not suffering interference ("BF1=OK" is at "Y" in FIG. 4), the relay node does not carry out the toggling of frequency band and the execution of the method returns to step S0.

If after the end of temporisation, the first frequency band is detected suffering interference at step S12 ("BF1=OK" is at "N" in FIG. 4), the management unit UG executes step S2 for selecting a new frequency band BFi from among the free frequency bands of the table of frequencies TBF. The table of frequencies may have been updated beforehand.

The random temporisation Trand avoids any conflict of selection of a same second frequency band by two close relay nodes which detect at the same time an interference in the frequency band in use. Temporisation makes it possible to defer the selection of the second frequency band if necessary.

The invention claimed is:

1. A method of progressive toggling from a first frequency band to a new frequency band, first mobile nodes being previously attached to a cell of a relay node, the method comprising upon detection by the relay node of interference on the first frequency band, the relay node triggers the progressive toggling which includes:
    selecting by the relay node of a new frequency band not suffering interference, the new frequency band being separate from the first frequency band;
    occupying the new frequency band by the relay node by at least one transmission on a control channel of the new frequency band, wherein the occupation of the new frequency band is carried out by the broadcasting by the relay node of one or more signals on a control channel of the new frequency band to each first mobile node not yet active in the cell and to at least one second mobile node entering into the cell of the relay node;
    toggling first radio communications of the first active mobile nodes from the first frequency band to the new frequency band, wherein during the toggling, the relay node remains accessible to connection via the first frequency band to the first mobile nodes previously attached to a cell;
    blocking access to the connection to the relay node via the first frequency band for the at least one second mobile node entering into the cell of the relay node while the toggling is in progress, said blocking including at least one transmission of a signal by the relay node on a control channel of the first frequency band to the at least one second mobile node to inform the at least one second mobile node of the impossibility to connect to the relay node via the first frequency band, and
    freeing the first frequency band by the relay node, said freeing including stopping the transmission of the signal by the relay node on a control channel of the first frequency band.

2. The method according to claim 1, wherein the selection of the new frequency band is carried out from among a plurality of different frequency bands defined in a table of frequency bands.

3. The method according to claim 1, wherein the one or more signals include a synchronisation signal and system information by the relay node on a control channel of the new frequency band.

4. The method according to claim 3, wherein the freeing of the first frequency band is carried out by stopping the broadcasting of the synchronisation signal and system information on the control channel of the first frequency band.

5. The method according to claim 3, wherein after the detection of interference on the frequency band the relay node triggers a random toggling time and on the passing of said toggling time if the first frequency band is suffering interference, the progressive toggling is triggered.

6. The method according to claim 1, wherein the blocking is carried out by the broadcasting of system information via the first frequency band, the system information including:
    an inaccessibility to the connection to the relay node via the first frequency band from a first time-stamped data, and an accessibility to the connection to the relay node via the new frequency band from a second time-stamped data.

7. The method according to claim 1, wherein the toggling of the first active nodes from the first frequency band to the new frequency band corresponds to a handover of a mobile node from a first relay node accessible via the first frequency band to a second relay node accessible via the new frequency band, the first relay node and the second relay node being a single and same relay node.

8. The method according to claim 1, wherein the toggling of a first active node from the first frequency band to the new frequency band corresponds to a first toggling of transmission of traffic data on the resources of the new frequency band, the control data being broadcast via the first frequency band, then a toggling of transmission of control data on the resources of the new frequency band.

9. A relay node of a radio communication system configured to execute steps of a method of progressive toggling from a first frequency band to a new frequency band upon detection by the relay node of interference on the first frequency band, and first mobile nodes being previously attached to the relay node via the first frequency band, the relay node comprising:
    a circuit for detecting interference on the first frequency band,
    a circuit for selecting a new frequency band not suffering interference, the new frequency band being separate from the first frequency band,
    a circuit for occupying the new frequency band by transmitting a signal on a control channel of the new frequency band, wherein occupation of the new frequency band is carried out by the broadcasting by the relay node of one or more signals on a control channel of the new frequency band to each first mobile node not yet active in the cell and to at least one second mobile node entering into the cell of the relay node,
    a circuit for toggling first radio communications of the first active mobile nodes from the first frequency band to the new frequency band, wherein during the toggling, the relay node remains accessible to connection via the first frequency band to the first mobile nodes previously attached to a cell,
    a circuit for blocking access to the connection to the relay node via the first frequency band for the at least one second mobile node entering into the cell of the relay node while the toggling is in progress, said blocking including at least one transmission of a signal by the relay node on a control channel of the first frequency band to the at least one second mobile node to inform the at least one second mobile node of the impossibility to connect to the relay node via the first frequency band, and a circuit for freeing the first frequency band by the relay node, said freeing including stopping the transmission of the signal by the relay node on a control channel of the first frequency band.

* * * * *